United States Patent [19]
Thomas

[11] 4,050,304
[45] Sept. 27, 1977

[54] APPARATUS FOR MEASURING MASS FLOW OF FLUIDS

[75] Inventor: Alan Thomas, Stratford-on-Avon, England

[73] Assignee: Lucas Industries Limited, Birmingham, England

[21] Appl. No.: 727,229

[22] Filed: Sept. 27, 1976

[30] Foreign Application Priority Data

Oct. 4, 1975 United Kingdom ............... 40704/75

[51] Int. Cl.$^2$ ........................... G01F 1/32; G01F 1/76
[52] U.S. Cl. ............................... 73/194 B; 73/194 M
[58] Field of Search .......... 73/194 B, 194 VS, 194 M; 137/835

[56] References Cited

U.S. PATENT DOCUMENTS

| 3,785,204 | 1/1974 | Lisi | 73/194 |
| 3,889,534 | 6/1975 | Grant | 73/194 |

Primary Examiner—Herbert Goldstein

[57] ABSTRACT

An apparatus for measuring the mass flow of fluids comprises a fluidic oscillator which oscillates at a frequency dependent on the volume flow rate through the oscillator, a circuit is responsive to signals which are respectively dependent on the oscillating frequency and on the pressure difference across the oscillator to generate an output signal proportional to $$2Sc_o^{3/2}A_o^2 \cdot P/f$$

where
- $S$ = Strouhal number of the oscillator
- $c_o$ = orifice coefficient of the oscillator
- $A_o$ = equivalent area of the oscillator
- $P$ = pressure difference across the oscillator
- $f$ = frequency of oscillation.

3 Claims, 4 Drawing Figures

APPARATUS FOR MEASURING MASS FLOW OF FLUIDS

This invention relates to apparatus for measuring the mass flow of fluids.

According to the invention an apparatus for measuring the mass flow rate of fluids comprises a fluidic oscillator, the frequency of oscillation of which is a function of the volume flow rate therethrough, means for generating a first electrical signal dependent on said frequency of oscillation, means for generating a second electrical signal dependent on the pressure difference across said oscillator, and means, responsive to said first and second electrical signals, for generating an output signal proportional to $$2Sc_o^{3/2}A_o^2 \cdot P/f$$

where
- $S$ = Strouhal number of said oscillator
- $c_o$ = orifice coefficient of said oscillator
- $A_o$ = equivalent area of said oscillator and are fixed functions of said oscillator, and $P$ and $f$ respectively are said pressure difference and said frequency of oscillation.

Figure 1:
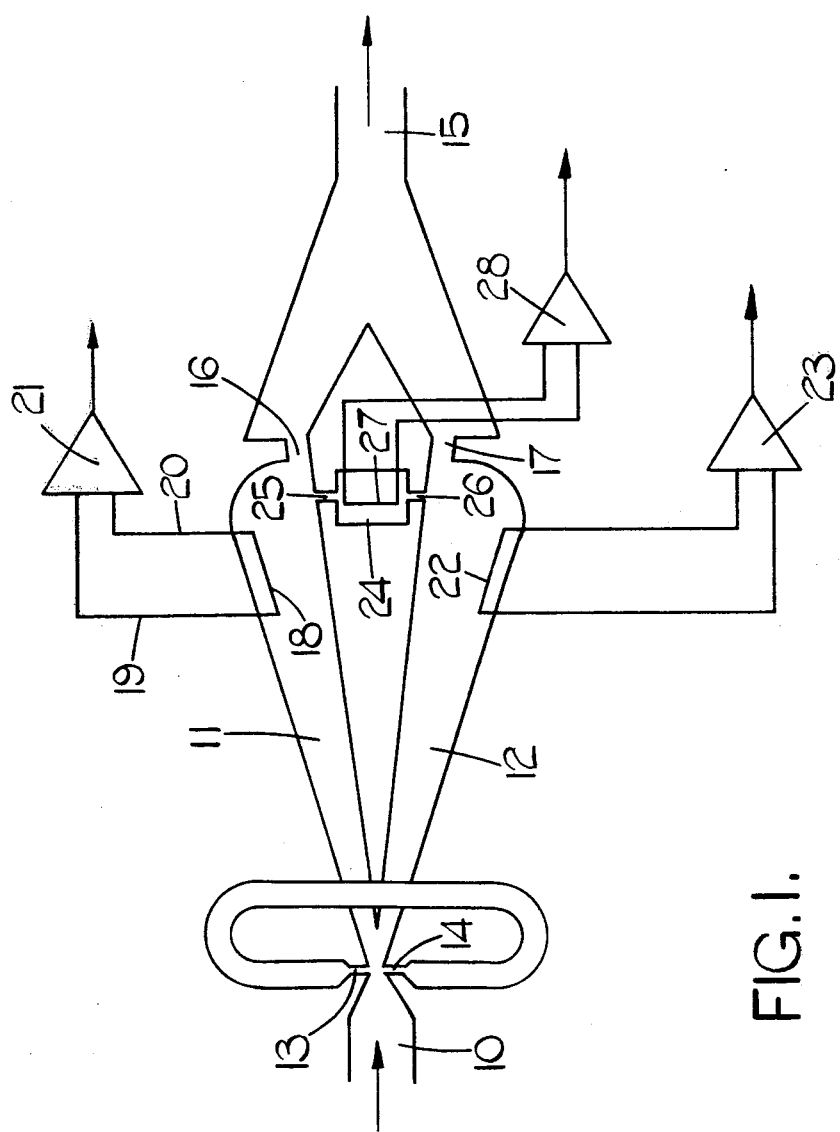
Figure 2:
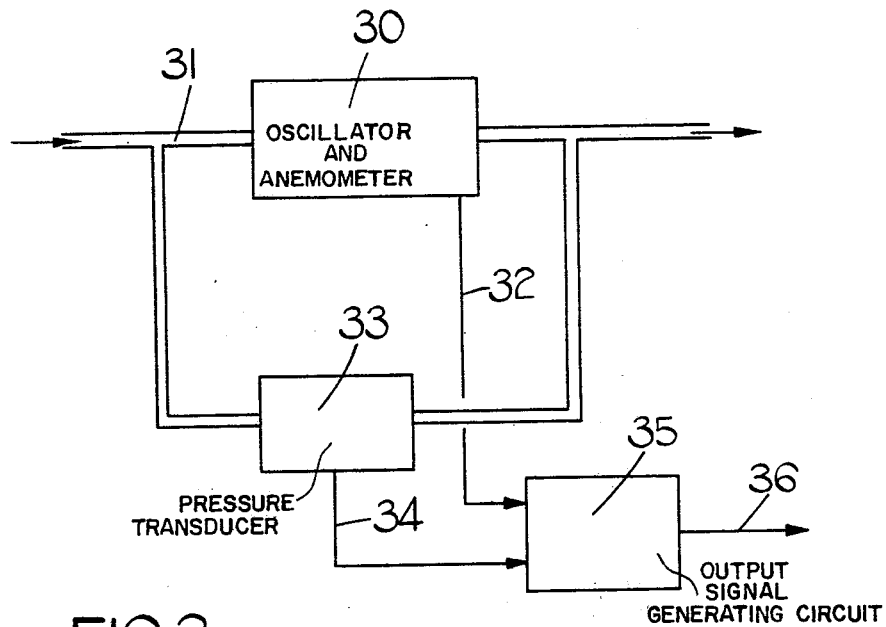
Figure 3:
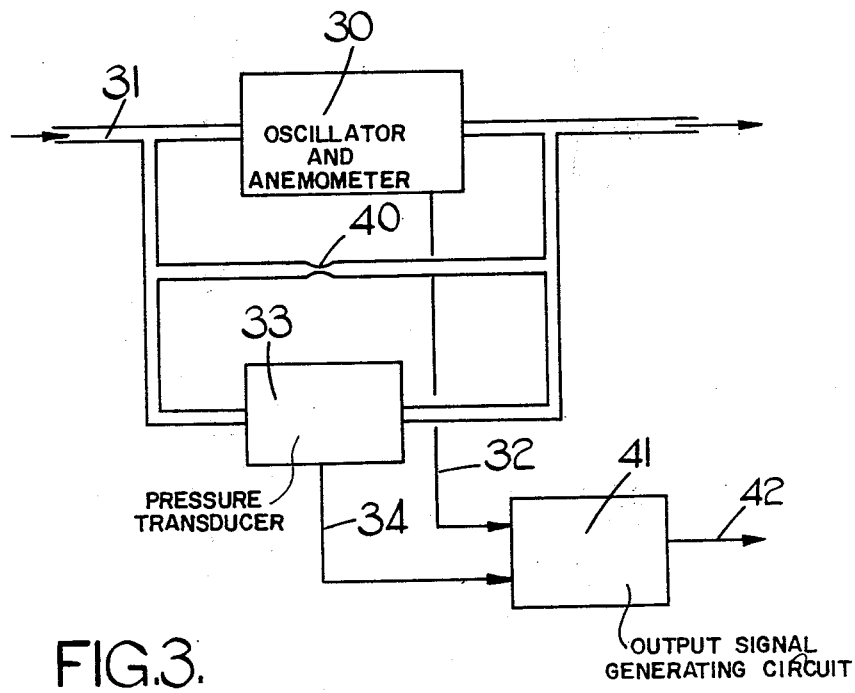
Figure 4:
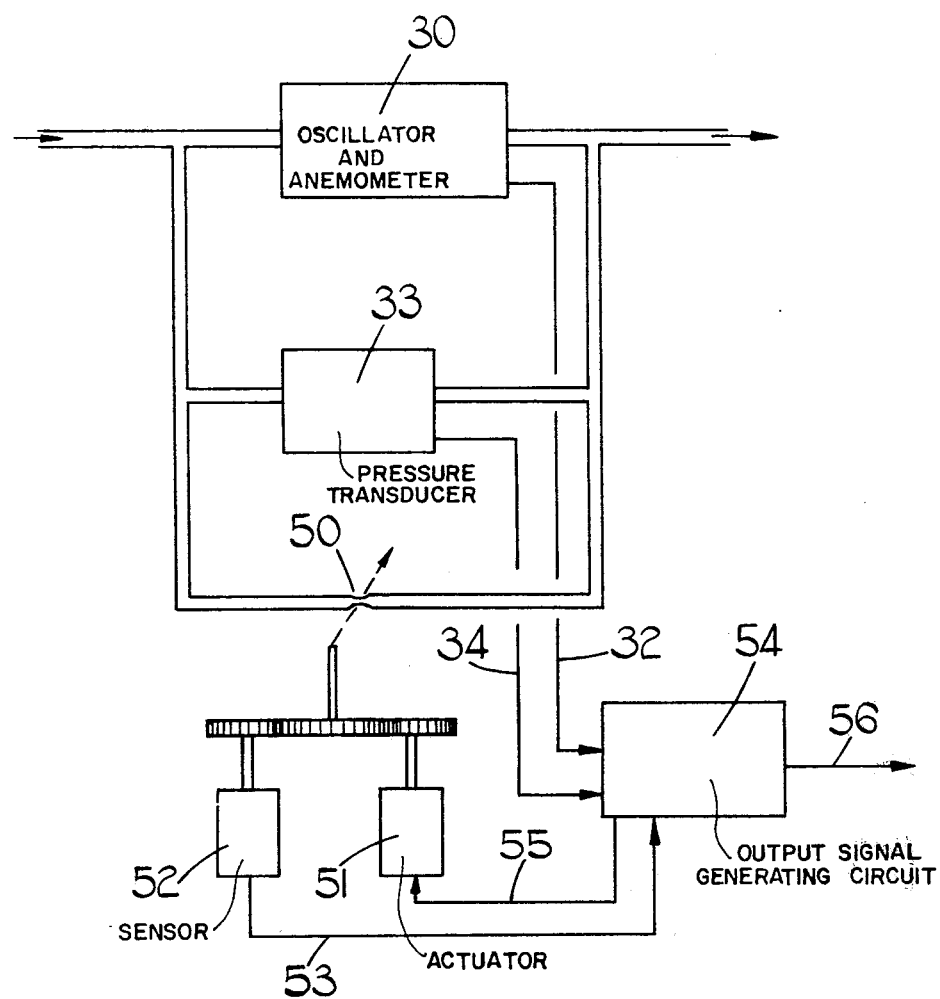

According to another aspect of the invention there is provided a fluidic oscillator and means for generating said first and second electrical signals, as above defined, a flow restrictor in parallel with said oscillator, and means, responsive to said first and second electrical signals, for generating an output signal proportional to $$2S(c_oA_o + c_RA_R)c_o \cdot P/fA_o^{1/2}$$

where
- $A_R$ = area of said flow restrictor
- $C_R$ = orifice coefficient of said flow restrictor Examples of the invention will now be described with reference to the accompanying drawings, in which:

FIG. 1 shows a fluidic oscillator, and means for generating electrical frequency signals, FIG. 2 shows a mass flow measuring apparatus, and FIGS. 3 and 4 show alternative forms of mass flow measuring apparatus.

The oscillator shown in FIG. 1 is constructed by connecting together the two control ports of a bistable wall attachment effect device, and also connecting together the two outlets. In the drawing the device comprises an inlet nozzle 10 which opens at the junction of two inclined passages 11, 12. A pair of interconnected control ports 13, 14 are arranged adjacent the nozzle 10 to deflect the jet therefrom when fluid issues from either of the ports 13, 14. Thus, in use, a fluid pulse from the port 13 will deflect the jet into the passage 12 where it will remain by virtue of the wall attachment effect. Similarly a fluid pulse from the port 14 will deflect the jet into the passage 11.

The two passages 11, 12 connect the inlet nozzle 10 to a common outlet 15 via a pair of flow restrictors 16, 17.

Within the passage 11 is a sensing element 18 which is of thin metal foil or wire and has its opposite ends connected by conductors 19, 20 to a control and amplifying circuit 21. Element 19 is, in use, heated by a constant voltage applied to the conductors 19, 20. The current flowing in conductors 19, 20 is dependent on the resistance of element 18, and thus on its temperature. The temperature of element 18 is, in turn, dependent on the fluid flow through the passage 11.

When fluid under pressure is applied to the nozzle 10, this flow is switched between the passage 11 and 12 at a rate determined by the volume flow through the oscillator. The temperature of the element 19 will thus fluctuate at the frequency of oscillation of the oscillator, and an output signal of this frequency will be supplied from the circuit 21.

A further sensing element 22 may additionally be located within the passage 12 and connected, as before, to a control and amplifying circuit 23. The output signal from circuit 23 will be a frequency signal whose phase is opposite to that of the signal from circuit 21.

The oscillator may include a chamber 24 connected via restrictions 25, 26 to the respective passages 11, 12. A sensing element 27 may be located within the chamber 24 in addition to, or instead of, either or both of the elements 18, 22 previously described. The pressure difference between passages 11, 12 is reversed twice with each oscillation of the oscillator, whereby the frequency output of a control and amplifying circuit 28 associated with the element 27 is twice the frequency of the fluidic oscillator.

It will be understood that any or all of the sensing elements 18, 22, 27 may be provided by, for example, pressure responsive elements, the associated control circuits being modified accordingly. It will also be understod that the sensing elements may be placed within the oscillator at any location at which a pulsing or reversing flow occurs.

It will be further understood that any form of fluidic oscillating device, whose frequency of oscillation is proportional to the volume flow therethrough, may be used for the present invention.

FIG. 2 shows, at 30, an oscillator and anemometer arrangement as described with reference to FIG. 1, connected in series in a fuel supply passage 31, so as to provide, on a line 32, a signal dependent on the oscillating frequency. A pressure transducer 33 is connected across the arrangement 30 so as to provide, on a line 34, an electrical signal which is a function of the pressure difference across the arrangement 30.

A circuit 35, which may include a digital to analog converter for the signals on line 32, or an analog to digital converter for the signals on line 34, generates, on a line 36, an output signal which is proportional to the rate of mass flow of fuel through the oscillator.

Operation of the circuit 35 is based on the following calculations.

Mass flow $M_o$ through the oscillator $= \rho Q_o$
where
$\rho$ is the fluid density and
$Q_o$ is the volume flow whence $$\rho = M_o/Q_o \tag{1}$$

Also $$M_o = c_oA_o(2\,P\,\rho)^{\frac{1}{2}} \tag{2}$$

where
- $c_o$ = the orifice coefficient of the oscillator
- $A_o$ = equivalent area of the oscillator
- $P$ = the pressure difference across the oscillator
- $c_o$ and $A_o$ are predetermined values for a given oscillator.

Also $$Q_o = f(A_o)^{3/2}/S \tag{3}$$

where
$f$ = frequency oscillation
$S$ = Strouhal number of the oscillator
$S$ is a predeterminable value of a given oscillator. from (2) $M_o^2 = c_o^2 A_o^2 2P \rho$ Substitute (1) for $\rho$ $$M_o^2 = c_o^2 2PM_o/Q_o$$

$$M_o = c_o^2 A_o^2 2P/Q_o$$

Substitute (3) for $Q_o$ $$M_o = c_o^2 A_o^2 2PS/f \qquad (4)$$

As indicated above, the value $c_o^2 A_o^2 S$ is a constant for a given oscillator, so that $$M_o = KP/f$$

The circuit 35 can thus provide a mass flow rate signal in response to the signals on lines 34 and 35.

It may be required to measure mass flows which are larger than those which can conveniently be handled by a fluidic oscillator. FIG. 3 shows a modified form of the invention whereby this may be achieved.

A flow restrictor 40 is connected in parallel with the arrangement 30 and the differential pressure transducer 33. A circuit 41 is responsive to the signals on lines 32, 34 to provide an output signal on a line 42, as before. Circuit 41 includes, however, means for rendering the output signal dependent on the orifice area $A_R$ and orifice coefficient $c_R$ of the restrictor 40. Operation of the circuit 41 is based on the following calculations: Mass flow $M_R$ through restrictor 40 is given by:

$$M_R = c_R A_R (2 P\rho)^{\frac{1}{2}} \qquad (5)$$

from (2) and (5):

$$M_R = c_R A_R M_o/c_o A_o \qquad (6)$$

Total mass flow $M_T = M_o + M_R$
whence, from (4) and (6)

$$M_T = M_o (c_o A_o + c_R A_R)/c_o A_o$$

substituting from (4)

$$M_T = 2S(C_o A_o + c_R A_R) c_o P/f A_o^{\frac{1}{2}} \qquad (7)$$

For a given oscillator arrangement 30 and restrictor 40 the value $2S(c_o A_o + c_R A_R) c_o/A_o^{\frac{1}{2}}$ is a constant, so that $$M_T = K P/f \qquad (8)$$

as before, and the signal on line 42 is thus proportional to the total mass flow through the arrangement 30 and orifice 40 in parallel.

In an alternative arrangement shown in FIG. 4 a variable restrictor 50 is provided, in parallel with the arrangement 30 and the transducer 33. The effective orifice size of restrictor 50 is variable by an electrical actuator 51. A sensor 52 is responsive to the setting of the restrictor 50 to provide, on a line 53, an electrical signal dependent on the area $A_R$ and coefficient $c_R$ of the restrictor 50.

A circuit 54 is responsive to the volume flow signal on line 32 from the oscillator arrangement 30 to the differential pressure signal on line 34 from the transducer 33, and to the $A_R c_R$ signal on line 53. Circuit 54 generates, on a line 55 to the actuator 51, a control signal which causes the flow through restrictor 50 to be varied so as to maintain the differential pressure constant. Circuit 54 also generates, on a line 56, an output signal proportional to the total mass flow through the arrangement 30 and restrictor 50. In this case, however, since differential pressure $P$ is maintained constant, equation (8) becomes $$M_T = K (A_o c_o + A_R C_R)/f \qquad (9)$$

I claim:

1. An apparatus for measuring the mass flow rate of fluids, comprising a fluidic oscillator, the frequency of oscillation of which is a function of the volume flow rate therethrough, means for generating a first electrical signal dependent on said frequency of oscillation, means for generating a second electrical signal dependent on the pressure difference across said oscillator, and means, responsive to said first and second electrical signals, for generating an output signal proportional to $$2Sc_o^{3/2}A_o^2 \cdot P/f$$

where
$S$ = Strouhal number of said oscillator
$c_o$ = coefficient of said oscillator
$A_o$ = equivalent area of said oscillator
and are fixed functions of said oscillator, and $P$ and $f$ respectively are said pressure difference and said frequency of oscillation.

2. An apparatus as claimed in claim 1, which includes a flow restrictor in parallel with said oscillator, and means, responsive to said first and second electrical signals, for generating an output signal proportional to
$$2S(c_o A_o + c_R A_R)c_o \cdot P/f A_o^{\frac{1}{2}}$$

where
$A_R$ = area of said flow restrictor
$C_R$ = orifice coefficient of said flow restrictor.

3. An apparatus as claimed in claim 2 in which said flow restrictor is a variable restrictor, and there is provided means, responsive to said second electrical signal, for varying the effective orifice size of said restrictor so as to maintain said pressure difference substantially constant.

* * * * *